United States Patent [19]
Davidson et al.

[11] Patent Number: 6,000,243
[45] Date of Patent: Dec. 14, 1999

[54] VACUUM PULL DOWN METHOD FOR AN ENHANCED BONDING PROCESS

[75] Inventors: James C. Davidson; Joseph W. Balch, both of Livermore, Calif.

[73] Assignee: The Regents of the University of California, Oakland, Calif.

[21] Appl. No.: 09/067,022

[22] Filed: Apr. 27, 1998

[51] Int. Cl.$^6$ .......................... C03B 23/20; C03B 11/08; C03B 23/00; C03C 27/02; B29C 1/26

[52] U.S. Cl. .......................... 65/36; 65/38; 65/34; 65/44; 65/56; 65/59.1; 65/59.4; 156/104; 156/286; 156/309.6; 29/428; 228/903; 264/102

[58] Field of Search ..................................... 65/36, 37, 38, 65/40, 59.1, 59.3, 59.4, 44, 34, 54, 56; 156/104, 286, 309.6, 308.2; 264/102; 29/428; 228/903

[56] References Cited

U.S. PATENT DOCUMENTS

| | | |
|---|---|---|
| 3,656,925 | 4/1972 | Dunlap . |
| 3,714,706 | 2/1973 | Reizman et al. . |
| 4,249,958 | 2/1981 | Baudin et al. . |
| 4,268,581 | 5/1981 | De Boel . |
| 4,290,838 | 9/1981 | Reavill et al. . |
| 4,367,108 | 1/1983 | Valimont et al. . |
| 4,647,327 | 3/1987 | Rase . |
| 4,781,783 | 11/1988 | Ash et al. . |
| 5,100,493 | 3/1992 | Leclere et al. . |

*Primary Examiner*—Stanley S. Silverman
*Assistant Examiner*—Jacqueline A. Ruller
*Attorney, Agent, or Firm*—L. E. Carnahan

[57] ABSTRACT

A process for effectively bonding arbitrary size or shape substrates. The process incorporates vacuum pull down techniques to ensure uniform surface contact during the bonding process. The essence of the process for bonding substrates, such as glass, plastic, or alloys, etc., which have a moderate melting point with a gradual softening point curve, involves the application of an active vacuum source to evacuate interstices between the substrates while at the same time providing a positive force to hold the parts to be bonded in contact. This enables increasing the temperature of the bonding process to ensure that the softening point has been reached and small void areas are filled and come in contact with the opposing substrate. The process is most effective where at least one of the two plates or substrates contain channels or grooves that can be used to apply vacuum between the plates or substrates during the thermal bonding cycle. Also, it is beneficial to provide a vacuum groove or channel near the perimeter of the plates or substrates to ensure bonding of the perimeter of the plates or substrates and reduce the unbonded regions inside the interior region of the plates or substrates.

16 Claims, 1 Drawing Sheet

VACUUM PULL DOWN METHOD FOR AN ENHANCED BONDING PROCESS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to fusion bonding, particularly to vacuum fusion bonding, and more particularly to a process involving vacuum pull down that enables increasing the bonding temperature to produce enhanced bonding.

Typical bonding processes require essentially optically flat substrates in order to assure uniform sealing. This is particularly the case in large substrate applications (e.g., >4-inch substrates). The primary problem in bonding substrates without voids is that most substrates are non-uniform in flatness. This results in non-contact areas when substrates are aligned for bonding. The non-contact areas cause several problems in that gas or air can be entrapped in the interstitial space where the substrates are not in contact. This will lead to a void and non-bonded area and also has the potential of forcing the substrates apart preventing any bonding and/or misaligning the substrates which might be registered on the other.

The present invention provides a bonding process which overcomes the above-mentioned problems. The process includes incorporating vacuum pull down to ensure uniform surface contact during the bonding process. The process provides for effectively bonding arbitrary sized and shaped substrates, such as glass, plastics, alloys, etc., which have a moderate melting point with a gradual softening point curve. The process is especially effective in bonding applications wherein one or both of the substrates to be bonded contain microchannels or grooves to be embedded between the substrates, and which can be used to apply vacuum between the substrates during the bonding process. The vacuum pull down, in addition to providing a differential pressure, enables both holding and alignment of the substrates.

SUMMARY OF THE INVENTION

It is an object of the present invention to provide a vacuum fusion bonding process.

A further object of the invention is to provide a bonding process which incorporates vacuum pull down.

A further object of the invention is to provide vacuum pull down for enhanced bonding of substrates of various sizes and shapes.

Another object of the invention is to provide a bonding process incorporating vacuum pull down whereby substrates can be bonded without voids.

Another object of the invention is to provide a process for bonding substrates, which includes vacuum pull down of the substrates, thereby eliminating the entrapment of gas or air within the bonded substrates.

Another object of the invention is to provide an enhanced vacuum fusion bonding process for substrates having a moderate melting point with a gradual softening point curve, such as glass, some plastics, and certain alloys. Basically, the invention is a process incorporating vacuum pull down for enhanced fusion bonding of substrates. The process is particularly applicable for large substrate bonding, such as the conventionally utilized substrates or wafers which may have diameters up to and greater than four (4) inches. The process eliminates non-contact areas between the substrates and thus eliminates the prior need for optically flat substrate surfaces in order to assure uniform sealing during the bonding process. The bonding process of this invention utilizes an active vacuum source to evacuate the interstices between the substrates, while at the same time provides a positive force to hold or align the substrates during bonding.

The vacuum pull down of the substrates allows one to increase the temperature of the bonding process to ensure that the softening point of the substrates has been reached and small void areas are filled and come in contact with the opposing substrate. This process is particularly effective for bonding applications wherein one or more of the substrates contain microchannels or grooves that can be used to apply vacuum between the substrates during the thermal bonding cycle.

BRIEF DESCRIPTION OF THE DRAWINGS

The accompanying drawings, which are incorporated into and form a part of the disclosure, illustrate the advantages of the invention and, together with the description, serve to explain the principles of the invention.

DETAILED DESCRIPTION OF THE INVENTION

Figure 1:
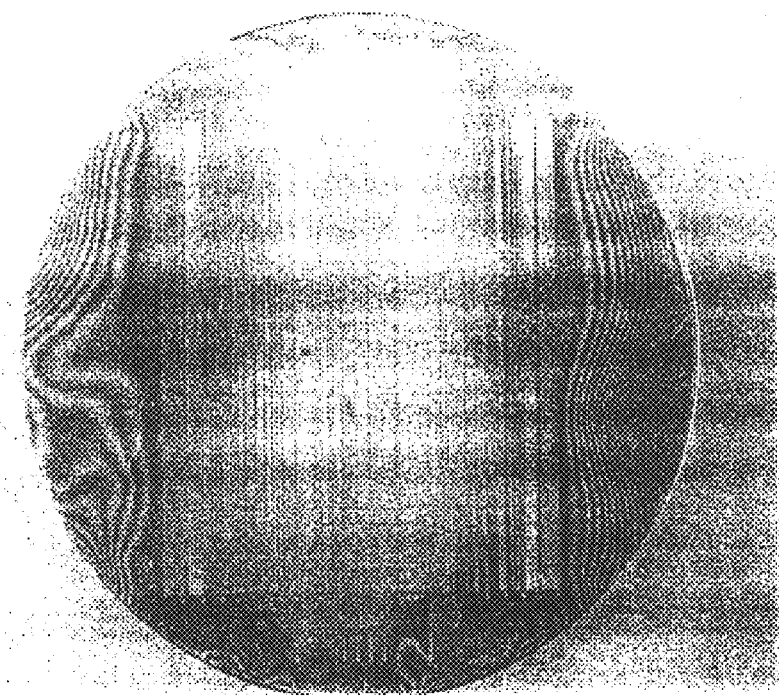
FIG. 1 illustrates a pair of bonded substrates utilizing conventional thermal fusion bonding.

The present invention is directed to the vacuum fusion bonding process wherein vacuum pull down enhances bonding of arbitrary sized and shaped substrates. The essence of the present invention is a process for bonding while applying an active vacuum source to evacuate the interstices between substrates being bonded, while at the same time providing a positive force to hold the substrates in contact. This allows one to increase the temperature of the bonding process to ensure that the softening point of the substrates has been reached and small void areas therebetween are filled and come in contact with the opposing substrate. The process is most effective for applications where the design of at least one of the substrates being bonded contains microchannels or grooves that can be used to apply vacuum between the substrates during the thermal bonding cycle. Designs for microanalytical applications, such as for gas chromatography, liquid chromatography, electrophoresis, and various other microanalytical processes, are examples of designs where one or more substrates will include microchannels that can be used to apply and distribute the vacuum between the substrates during thermal bonding.

The present invention is not limited to the above-referenced applications where the design includes microchannel, but can be used for any application where one can place an arrangement of vacuum channels or chambers on one or more substrates or plates so that the substrates can be pulled together when they are assembled and thermally bonded. Also, the present invention is applicable for bonding, for example, three substrates, the two outer substrates having microchannels or grooves located adjacent the central substrate, and can be positioned such that the microchannels in each of the two substrates are parallel or transverse to one another. For example, a perimeter vacuum groove or channel can be formed near the outer edge of one of the substrates to be bonded and which may also be a useful addition to vacuum channels in the interior of one or more of the substrates.

The perimeter channel or groove, as well as any channels or grooves in either of the substrates, can be produced by a variety of known machining methods dependent upon the materials to be bonded. Examples of known machining methods include chemical etching, ion milling, precision sawing, precision milling by ultrasound or hard tool bit.

In carrying out the process of the present invention, the substrates, such as glass plates or wafers having microchannels or grooves formed therein, for example, are aligned and may be temporarily clamped to maintain a desired alignment until an active vacuum source (560 to 760 Torr) can be applied to the microchannels or grooves, which also provides a holding force such that the temporary clamps, if used, can be removed. Also, a perimeter channel or groove may be formed on one of the substrates to serve as a vacuum channel. The applied vacuum provides a large distributed force that is developed and presses the substrates or plates together from the difference in pressure between the ambient (high pressure) and the pressure in the microchannels or grooves in the substrates (low pressure). With the vacuum source connected to the substrates, such as by holes formed in one substrate to communicate with the microchannels or grooves, the substrates can be moved into a thermal furnace or oven for bonding by a conventional fusion heat cycle which heats the substrates to the softening temperature (temperature of 560° C. –700° C. for glass) for about one hour. The furnace or oven may have a slight pressure over ambient due, for example, to flowing of high purity nitrogen.

Tests have shown that a complete fusion bond of seamless, fullstrength, void-free quality is obtained through the composite (bonded) assembly because the glass is heated into its softening temperature zone and because the differential pressure on the substrates, resulting from the applied vacuum to the interior microchannels or grooves, forces the substrates into contact with one another.

Figure 2:
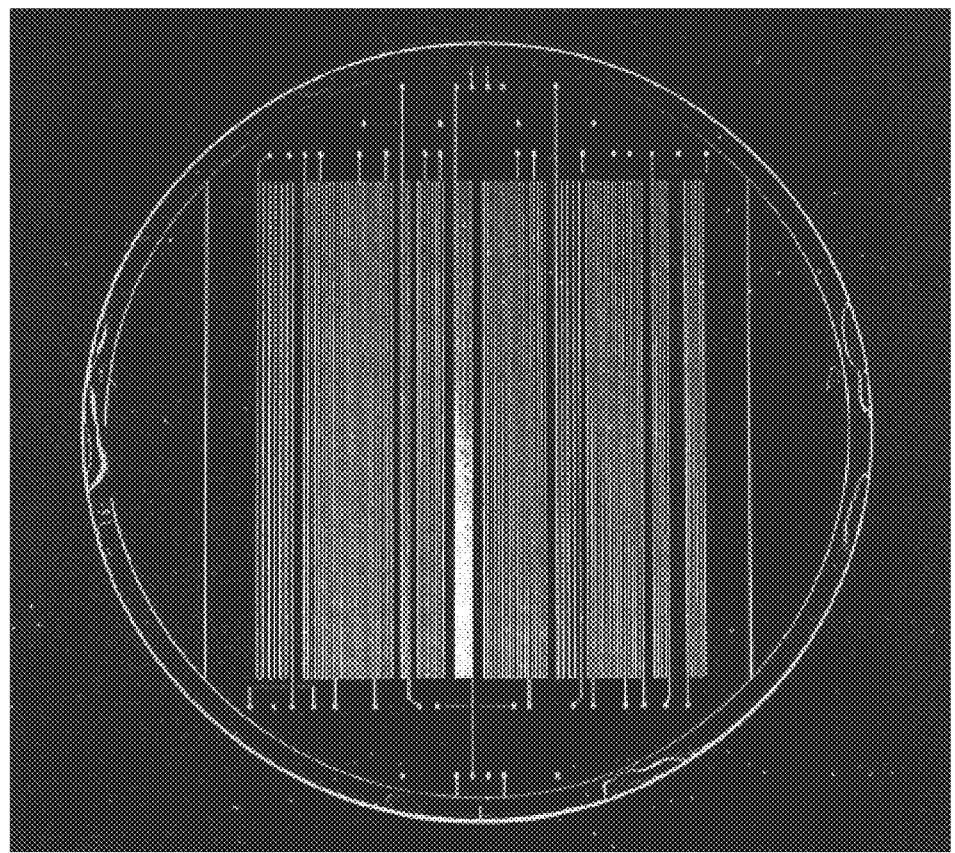
FIG. 2 illustrates a pair of bonded substrates utilizing vacuum thermal fusion bonding in accordance with the present invention.

FIGS. 1 and 2 show a comparison of ordinary or prior art thermal fusion bonding and vacuum thermal fusion bonding according to the present invention for two four-inch round borosilicate glass plates in which both sets of plates were subjected to the same temperature cycle. The maximum temperature reached during the thermal temperature cycle of both FIGS. 1 and 2 was between the annealing and softening point (600° C.) for the glass material. The glass plates of both FIGS. 1 and 2 have an array of etched parallel microchannels for a microanalytical process. FIG. 1 shows the set of plates bonded without applying any vacuum to them during the high temperature bonding cycle. Many interference fringes are visible which indicate regions where the plates have not bonded completely. FIG. 2 shows the same plate design as FIG. 1 but with a vacuum channel or groove added around the perimeter of one of the plates and vacuum applied to both the interior microchannels and the perimeter channel during the thermal fusion bonding cycle. A significant reduction in the number of interference fringes is visible. The remaining interference fringes in FIG. 2 are only visible in the narrow region outside the outer vacuum channel near the perimeter of the glass plates.

The following is an example of an operational sequence for vacuum fusion bonding a pair of glass plates or substrates:

1. Form microchannels of a desired number, size, and configuration in the surface of one of a pair of glass plates to be bonded.

2. Form a channel around the perimeter of one of the pair of glass plates.

3. Form vacuum passageways, such as holes and/or grooves, in one of the glass plates to enable vacuum communication with the microchannels and the perimeter channel.

4. Align the holes and the channels of the two plates, and preferably temporarily clamp the plates together to retain desired alignment. C-type wire clamps may be used, for example.

5. Attach a vacuum source to the holes in the one plate as by a vacuum manifold which may merely rest on the surface of the plate having the holes, such that there is a vacuum seal between the vacuum manifold and the glass plate surface.

6. Draw a vacuum sufficient to hold the plates together due to the differential pressure between the ambient on the outer surfaces of the plates and the vacuum on the inner surfaces (channels) of the plates so as to produce a substantially uniform contact of the plates.

7. While maintaining the vacuum, transfer the plates into a thermal fusion bonding oven or furnace.

8. Remove the temporary clamps.

9. Thermally bond the glass plates while maintaining the vacuum by heating the plates to the softening temperature of the glass, whereby the differential pressure as a result of the applied vacuum will completely bond the plates without voids and completely cover each of the microchannels so that there is no fluid or gas crossover therebetween.

10. Remove the bonded composite plate assembly from the oven, and remove the vacuum source, leaving the bonded glass plate composite with a minimal of interference fringes as shown in FIG. 2.

Depending on the materials to be bonded, the location of the microchannels and/or the grooves or regions formed in one or more of the plates to be bonded, the perimeter vacuum channel may not be needed, since its function is to assure sufficient surface area within the adjacent plates to be bonded available to enable the differential holding pressure to force the plates together during the thermal bonding cycle. Also, holes may be formed in opposite ends of the substrate as to be in communication with each end of the microchannel, but which are closed during bonding, and whereafter the holes provide inlets and outlets for the microchannels.

While the process has been described using glass plates or substrates, the process can be effectively utilized to bond other materials, such as certain plastics or alloy substrates, having a moderate melting point with a gradual softening point curve.

It has thus been shown that the present invention provides an enhanced bonding process by the use of vacuum pull down and is particularly applicable to vacuum fusion bonding of substrates wherein microfluidic channels, for example, are embedded between the substrates. The vacuum applied to the microchannels produces a differential pressure which holds the surfaces of the substrates in contact with one another during the thermal (fusion) bonding operation. The application of vacuum pull down (pressures) enables an increase in the bonding temperature so as to soften and completely bond the adjacent surfaces of the substrates.

While a particular embodiment, operational sequence, materials, parameters, etc., have been illustrated or described to exemplify and teach the principles of the invention, such are not intended to be limiting. Modifications and changes may become apparent to those skilled in the art, and it is intended that the invention be limited only by the scope of the appended claims.

The invention claimed is:

1. In a process for fusion bonding of substrates, the improvement comprising:
   applying a vacuum intermediate the substrates to produce substantially uniform contact of the substrates,
   forming at least one channel in at least one of the substrates to form a vacuum channel intermediate the substrates, and
   connecting the at least one channel to the vacuum.

2. The improvement of claim 1, additionally including forming a perimeter vacuum channel in addition to the at least one channel, so as to be intermediate the substrates, and connecting the perimeter vacuum channel to the vacuum.

3. The improvement of claim 2, wherein connecting the vacuum to the at least one channel includes forming a hole in one of the substrates to provide vacuum communication with the at least one channel.

4. The improvement of claim 3, wherein connecting the vacuum of the perimerter vacuum channel includes forming a vacuum communication between the hole in the one substrate and the perimeter vacuum channel.

5. The improvement of claim 1, additionally including forming a number of microchannels and at least one perimeter vacuum channel in at least one of the substrates, and forming vacuum passageways in at least one of the substrates to provide vacuum communication with the microchannels and the perimeter vacuum channel.

6. The improvement of claim 5, additionally including forming the vacuum passageways by forming at least one hole in one of the substrates, and forming a means in that substrate interconnecting the at least one hole and each of the microchannels and perimeter vacuum channel.

7. A vacuum pull down process for enhanced bonding of substrates, comprising:
   positioning at least two substrates to be bonded in surface contact with one another,
   evacuating any interstices between the substrates, and thermally bonding the substrates,
   forming a vacuum chamber in at least one of the substrates, and connecting a vacuum source to the vacuum chamber.

8. The process of claim 7, wherein connecting the vacuum source to the vacuum chamber is carried out by forming at least one hole in another of the at least two substrates, so as to be aligned with the vacuum chamber, and connecting the vacuum source to the at least one hole.

9. The process of claim 8, wherein forming the vacuum chamber is carried out by forming a number of microchannels in the at least one substrate.

10. The process of claim 8, wherein forming the vacuum chamber is carried out by forming at least one perimeter vacuum chamber in the at least one substrate.

11. The process of claim 10, additionally including forming a means in at least one of the substrates which provide vacuum communication between the at least one hole and the number of microchannels and the at least one perimeter vacuum chamber.

12. The process of claim 7, wherein evacuating the interstices between the substrates is carried out by forming at least one hole in one of the substrates, and connecting a vacuum source to the at least one hole.

13. The process of claim 12, wherein connecting the vacuum source is carried out by mounting a vacuum manifold connected to the vacuum source over the at least one hole.

14. The process of claim 13, additionally including forming the vacuum manifold so as to provide a vacuum seal about the at least one hole.

15. A process for bonding glass substrates having at least one microchannel therebetween, which includes:
   forming at least one vacuum communication passageway in one of the substrates so as to be in alignment with the at least one microchannel therebetween,
   applying an active vacuum source to evacuate at least the at least one microchannel between the substrates, and
   at the same time providing a positive force to hold the glass substrates in contact with each other.

16. The process of claim 15, wherein the positive force is maintained by the active vacuum source during the thermal bonding cycle of the glass plates.

* * * * *